US012301734B2

(12) United States Patent
Goodman et al.

(10) Patent No.: US 12,301,734 B2
(45) Date of Patent: May 13, 2025

(54) ROLE-BASED PERMISSIONS IN A DISTRIBUTED PERMISSIONS NETWORK

(71) Applicant: DELL PRODUCTS L.P., Round Rock, TX (US)

(72) Inventors: Bradley Keith Goodman, Nashua, NH (US); Joseph Brent Caisse, Burlington, MA (US)

(73) Assignee: Dell Products L.P., Round Rock, TX (US)

( * ) Notice: Subject to any disclaimer, the term of this patent is extended or adjusted under 35 U.S.C. 154(b) by 201 days.

(21) Appl. No.: 18/158,022

(22) Filed: Jan. 23, 2023

(65) Prior Publication Data

US 2024/0250835 A1    Jul. 25, 2024

(51) Int. Cl.
*H04L 9/32* (2006.01)
*H04L 9/30* (2006.01)
*H04L 9/40* (2022.01)

(52) U.S. Cl.
CPC .......... *H04L 9/3268* (2013.01); *H04L 9/3073* (2013.01); *H04L 63/105* (2013.01)

(58) Field of Classification Search
CPC .... H04L 9/3268; H04L 9/3073; H04L 63/105
See application file for complete search history.

(56) References Cited

U.S. PATENT DOCUMENTS

| | | | |
|---|---|---|---|
| 7,809,644 B2 * | 10/2010 | Stefik | H04L 63/123 705/51 |
| 2008/0010449 A1 * | 1/2008 | Holtzman | G06F 21/79 713/157 |
| 2018/0183771 A1 * | 6/2018 | Campagna | H04L 63/061 |
| 2019/0102555 A1 * | 4/2019 | Novak | H04L 9/3268 |
| 2019/0260594 A1 * | 8/2019 | Singhal | H04L 63/06 |
| 2019/0327315 A1 | 10/2019 | Grooters et al. | |
| 2021/0051029 A1 | 2/2021 | Pham et al. | |
| 2021/0184864 A1 * | 6/2021 | Wentz | H04L 9/3218 |
| 2021/0399903 A1 * | 12/2021 | Brossard | H04L 9/3247 |
| 2022/0294643 A1 * | 9/2022 | Wang | H04L 9/3255 |
| 2022/0417034 A1 * | 12/2022 | Wang | H04L 63/0823 |
| 2023/0308277 A1 * | 9/2023 | Van Cleve | H04L 63/0807 |
| 2023/0344649 A1 * | 10/2023 | Zamani | G06Q 20/3227 |

* cited by examiner

Primary Examiner — Techane Gergiso
(74) Attorney, Agent, or Firm — Larson Newman, LLP

(57) ABSTRACT

An endpoint node of a multiple node environment includes a storage and a processor. The storage stores an owner public key for an owner of the endpoint node. The processor receives a work request for a job to be performed in the endpoint. The work request is signed with a first private key for a first user node. The processor retrieves first and second certificates. The first certificate attests that the first user node is part of a first group of users. The second certificate attests that the first group of users has permissions to perform the job in the end point node. Based on the owner public key and the first and second certificates, the processor validates the work request. In response to the work request being validated, the processor performs the job within the endpoint node.

16 Claims, 5 Drawing Sheets

ROLE-BASED PERMISSIONS IN A DISTRIBUTED PERMISSIONS NETWORK

FIELD OF THE DISCLOSURE

The present disclosure generally relates to information handling systems, and more particularly relates to role-based permissions in a distributed permissions network.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An endpoint node of a multiple node environment includes a storage that may store an owner public key for an owner of the endpoint node. A processor may receive a work request for a job to be performed in the endpoint. The work request may be signed with a first private key for a first user node. The processor may retrieve first and second certificates. The first certificate attests that the first user node is part of a first group of users. The second certificate attests that the first group of users has permissions to perform the job in the end point node. Based on the owner public key and the first and second certificates, the processor may validate the work request. In response to the work request being validated, the processor may perform the job within the endpoint node.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
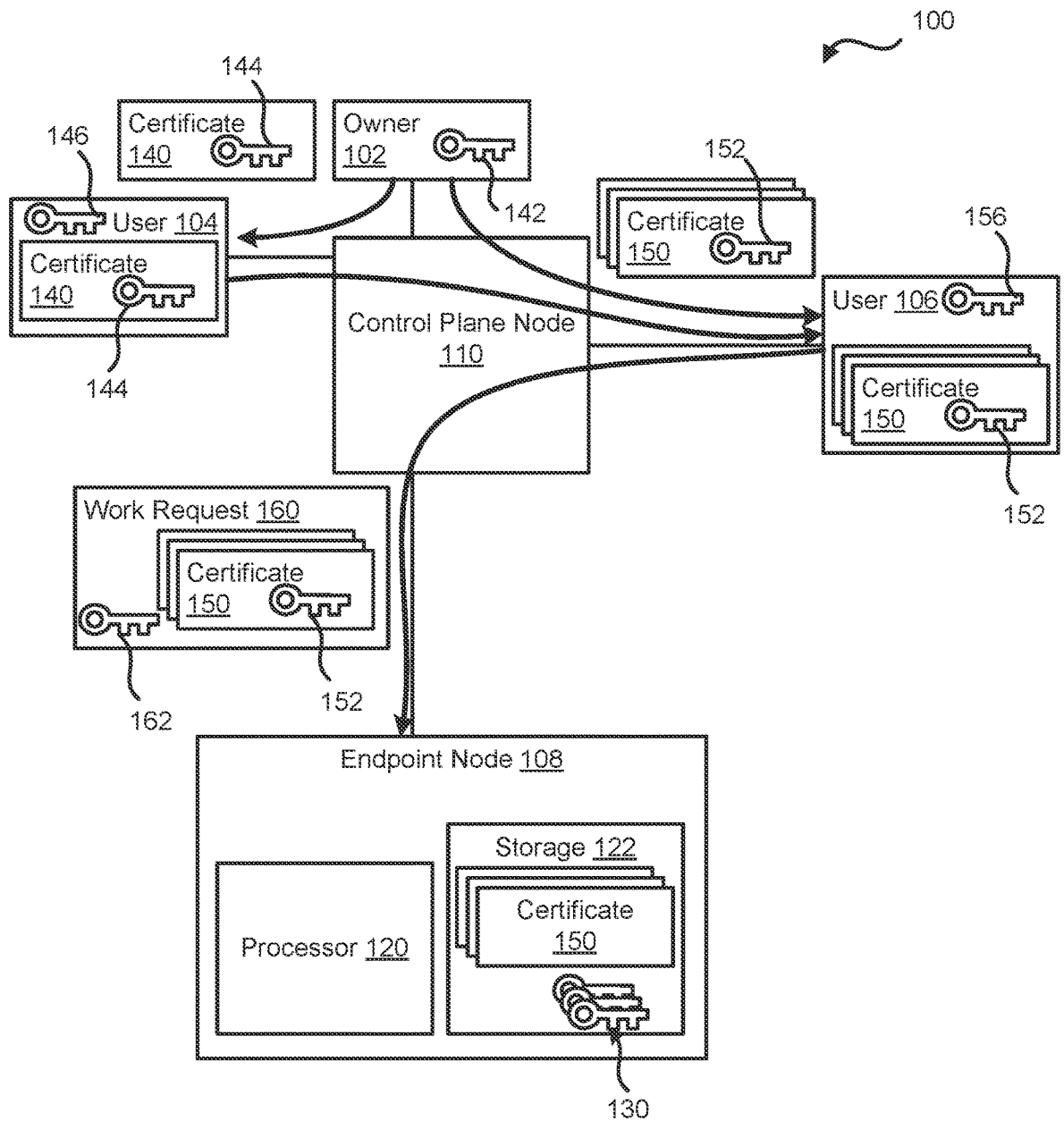
FIG. 1 is a block diagram of a multiple node environment according to at least one embodiment of the present disclosure.

FIG. 1 illustrates a multiple node environment 100 according to at least one embodiment of the present disclosure. Multiple node environment 100 includes an owner node 102 and user nodes 104 and 106 that may access an endpoint node 108 through a control plane 110. Endpoint node 108 may include a processor 120 and a storage 122. Control plane 110 may be any suitable type of control-plane, such as a global control plane node, regional control plane node, and local control plane node. In an example, owner node 102, user nodes 104 and 106, endpoint node 108, and control node 110 may be any suitable information handling system, such as substantially similar to information handling system 500 of FIG. 5, wherein each node may include a storage and a processor as described below with respect to FIG. 5. Multiple node environment 100 may include any suitable number of additional components or information handling systems without varying from the scope of this disclosure.

In an example, endpoint node 108 may store multiple public keys 130 in storage 122. In certain examples, each of public keys 130 may be associated with a different node in multiple node environment 100. For example, one of public keys 130 may be a cryptographic key that is part of a public/private key pair with owner private key 142 of owner node 102. Another one of public keys 130 may be part of a public/private key pair with user private key 146 of user node 104. Still another one of public keys 130 may be part of a public/private key pair with user private key 156 of user node 106. In an example, public keys 130 may be included within different certificates 150, which in turn may provide endpoint node 108 with access to the public keys. In this example, endpoint node 108 may utilize public keys 130 within certificates 150 to verify other certificates signed by the corresponding private keys.

In certain examples, public keys 130 or certificates 150 from owner node 102, user node 104, and/or user node 106 may be utilized by endpoint node 108 to authenticate any received messages or requests. In an example, one or more of certificates 150 may be role/group-based certificates. As will be described in detail below, some role/group-based certificates may be utilized to assign a user to a particular role or group, other role/group-based certificates may be utilized to assign a user to the role or group, and other role/group-based certificates may be utilized to grant permissions to the role or group.

In certain examples, an owner public key 130 may be hard coded within endpoint node 108 or any other suitable node outside of the control plane of multiple node environment 100. Each of owner node 102 and user nodes 104 and 106 may be associated with different users. As used herein a user may be a person or entity that may perform an operation, grant authority to another, given authority to do something, or the like. Owner node 102 may be an owner of endpoint node 108, such as a company, a user, entity, manager, or the like. In an example, security of public keys 130 may be increased based on the public keys being stored within a trusted platform module (TPM) of endpoint node 108.

In certain examples, owner 102 may perform one or more suitable operations to grant one or more rights or operations to users 104 and 106. For example, owner 102 may provide a signed certificate 140 to user 104 via control plane node 110. In an example, certificate 140 may be signed by an owner private key 142 and may authorize a user associated with user node 104 to perform one or more actions/operations as will be described below with respect to FIGS. 2-4. Certificate 140 may include a key signature 144 generated from owner private key 142. User node 104 may store certificate 140 and a user private key 146 in a storage of the user node. In an example, user private key 146 may be associated with the user of user node 104.

In an example, owner node 102 or user node 104 may issue one or more certificates to revoke or invalidate previous certificates. For example, owner node 102 no longer wants user node 104 to have the permissions granted in signed certificate 140, the owner node may generate a new certificate revoking signed certificate 140. In this example, owner node 102 may place the revoking certificate in a chain of role-based certificates, which may be used to invalidate signed certificate 140.

In certain examples, user node 106 may receive one or more certificates 150 from owner node 102 and/or user node 104. Each certificate 150 may include a different a key signature 152 and each of the key signatures may be generated from a different private key. For example, if owner node 102 provides one certificate 150, key signature 152 may be generated based on owner private key 142. If user node 104 provides one certificate 150, key signature 152 may be generated based on user private key 146. In an example, when certificates, such as certificate 140 and multiple certificates 150, are generated, the corresponding node may provide the certificates to endpoint node 108. In response to the reception of the certificate, processor 120 may store the certificate or certificates in storage 122.

Work request 160 may be signed with a key signature 162 generated from user private key 156, and may include one or more certificates 150 with corresponding key signatures 152. In an example, work request 160 may be self-authenticating such that the work request may include all signed certificates 150 with corresponding public keys 130 needed to attest that user node 106 has been given permission to have an operation be performed in endpoint node 108. For example, work request 160 may include a chain of certificates starting within a certificate from owner node 102 down to user node 106 verifying or attesting to the permissions for the requested operation to be performed in endpoint node 108.

In an example, work request 160 may only include the request for an operation to be performed and key signature 162 generated by private key 156 of user node 106. In this situation, processor 120 may determine whether certificates 150 stored in storage 122 provide a chain of authority or delegation from user node 106 up to owner node 102 for permission to have the requested operation performed in endpoint node 108. If certificates 150 provide the proper chain of authority, processor 120 may verify work request 160 and perform the operation within endpoint node 108. If certificates 150 do not provide the proper chain of authority, processor 120 may request that user node 106 send the one or more missing signed certificates to complete the proper chain of authority before the requested operation will be performed.

In previous multiple node environments, a distributed permissions architecture may be implemented with permissions that are derived from a single point of trust, and must be attested from that root for any operation to succeed. In this permission architecture, various permissions may be attested which ultimately allow an entity to perform an actual operation or work. However, operation of owner node 102, user nodes 106 and 108, and endpoint node 108 may be improved by granting role/group-based permissions as will be described with respect to FIGS. 2-4 below.

Figure 2:
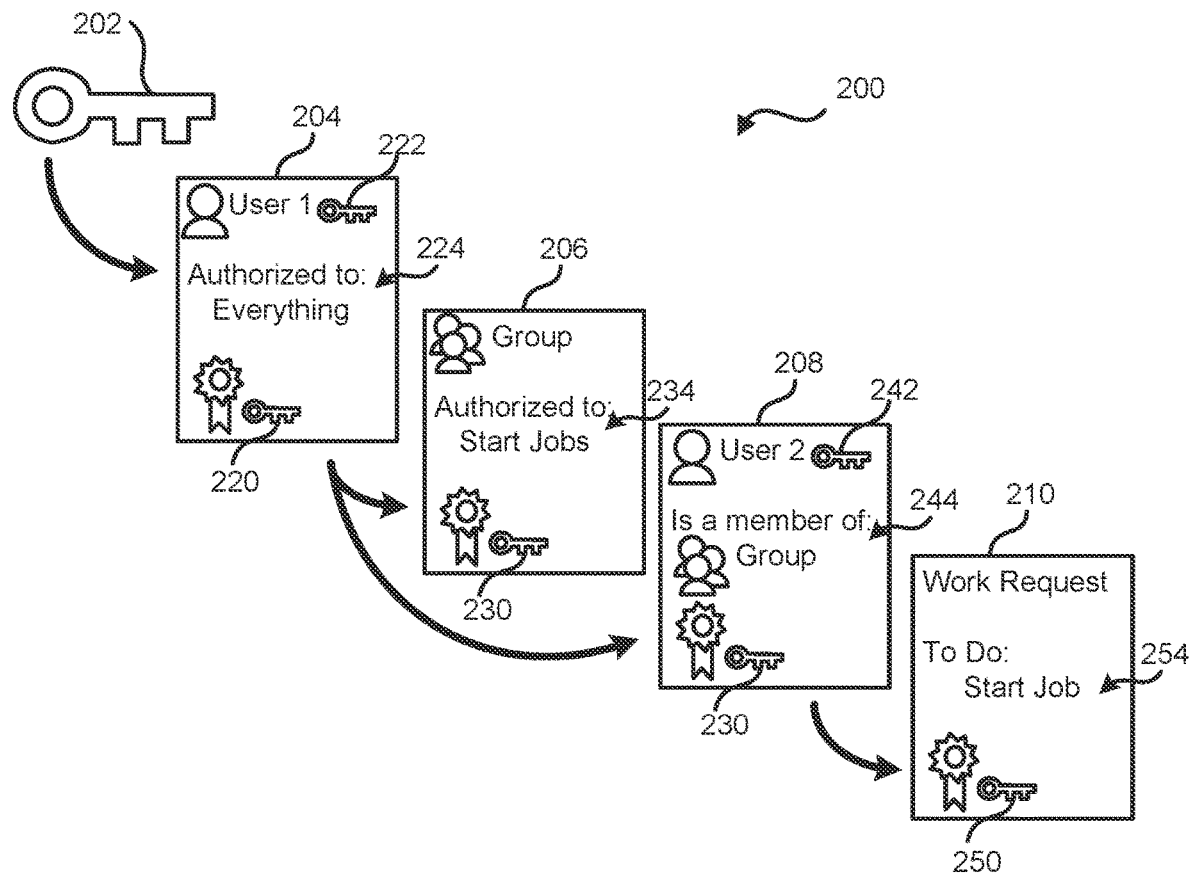
FIG. 2 is a diagram of a chain of role-based certificates according to at least one embodiment of the present disclosure.

FIG. 2 illustrates a chain of role-based certificates 200 according to at least one embodiment of the present disclosure. Chain of role-based certificates 200 includes owner/master key 202, a user certificate 204, a group certificate 206, a user certificate 208, and a work request 210. In an example, the users or their associated keys may be granted or authorized permissions within a multiple node environment, such as multiple node environment 100 of FIG. 1, by one or more of the certificates in chain of role-based certificates 200. In certain examples, a user may be able to perform work, such as an operation in endpoint node 108 of FIG. 1, if that user is permitted. For example, the user may be able to perform work granted by a certificate in chain of role-based certificates 200.

In an example, user certificate 204 may be created by private owner/master key 202 for an endpoint in a multiple node environment. User certificate 204 may include a cryptographic key signature 220 generated by private owner/master key 202. An endpoint node may verify cryptographic key signature 220 based on a public key of a public/private key pair associated with private owner/master key 202. In an example, user certificate 204 may also include a user public key 222 associated with a first user. In this example, user public key 222 may be part of a public/private key pair for the first user, and the user public key may be utilized by an endpoint node to verify certificates that are cryptographically signed with the associated user private key. User certificate 204 may grant the first user permissions 224 or authority to do everything in a multiple node environment. For example, the first user may have permissions to do work, grant permissions to other users or groups, assign people to any type of group/role, or the like.

Based on the permissions granted to the first user by user certificate 204, the first user may generate and cryptographically sign group certificate 206 and user certificate 208. In an example, group certificate 206 may include a cryptographic user signature 220 generated from a user private key of the first user. Group certificate 206 may implicitly define a group and grant any members of this group one or more permissions 234. For example, group certificate 206 may grant members of the group permissions 234 to start jobs in an endpoint of the multiple node environment. In certain examples, group certificate 206 may implicitly define the group may referencing, within the certificate itself, that the group exists.

In certain examples, user certificate 208 may include cryptographic user signature 230 generated from a user private key of the first user, such as private key 146 of user node 104 in FIG. 1. User certificate 208 may assign a second user membership in a group, such as the group defined by group certificate 206. In an example, user certificate 208 may define the second user or the associated private key as being allowed to perform the permissions of a given role or group. As used herein, group or role may be used interchangeably to define a set of individuals that are granted permissions.

In an example, user certificate 208 may also include a user public key 242 associated with the second user. In this example, user public key 343 may be part of a public/private key pair for the second user, and the second user public key may be utilized by an endpoint node to verify certificates that are cryptographically signed with the associated second user private key. User certificate 208 implies there is a particular group, and states that the second user is a member of that group. Based on user certificate 208, the second user is granted any permissions or privileges granted to members of the group identified in the user certificate.

Based on group certificate 206 and user certificate 208, the second user may perform an operation in endpoint node that the group has been granted permissions to perform. In an example, the second user may generate a work request 210 that may include cryptographic user signature 250 generated from a user private key of the second user, such as private key 156 of user node 106 in FIG. 1. In certain examples, work request 210 may include user certificate 204, group certificate 206, and user certificate 208 with respective cryptographic key signatures 220, 230, and 230. Based on work request 210 including user certificate 204, group certificate 206, and user certificate 208, the work request may be self-authenticating, such that the work request may data needed to attest that the second user has been given permission to have an operation 254 be performed in an endpoint node, such as endpoint node 108 of FIG. 1.

In an example, work request 210 may only include the request for operation 254 to be performed and key signature 250 generated by the private key for the second user. In this situation, the endpoint node may determine whether the needed certificates in chain of role-based certificates 200 are stored in the endpoint node to verify that the second user has been granted permissions to have requested operation 254 performed in the endpoint node. If the endpoint has all of the certificates in chain of role-based certificates 200, the endpoint may verify work request 210 and perform operation 254. However, if the endpoint does not have all of the certificates in chain of role-based certificates 200, the endpoint node may request that the second user provide the one or more missing signed certificates to complete the chain of role-based certificates before requested operation 254 will be performed. Thus, chain of role-based certificates 200 may enable the second user to perform operation 254 if the second user is attested as a member of a group and that group has been granted permissions to perform the operation.

Chain of role-based certificates 200 may improve certificate management by separating users or entities from the permissions granted to the users or entities. For example, user certificate 208 attests that the second user is part of a group but not explicitly grant any permissions to the second user. Instead, the explicit permissions are granted to all members of the group via group certificate 206. In this example, a number of individuals or entities may be added to or removed from the group based on creating or invalidating different user certificates attesting membership in the group. However, these certificates are separate from the permissions for the group, and these permissions may change based on different group certificates. In certain examples, an entity granted permission to control membership in a group does not need to be the granted permission to authorize permissions for that group as will be described below with respect to FIG. 3.

Figure 3:
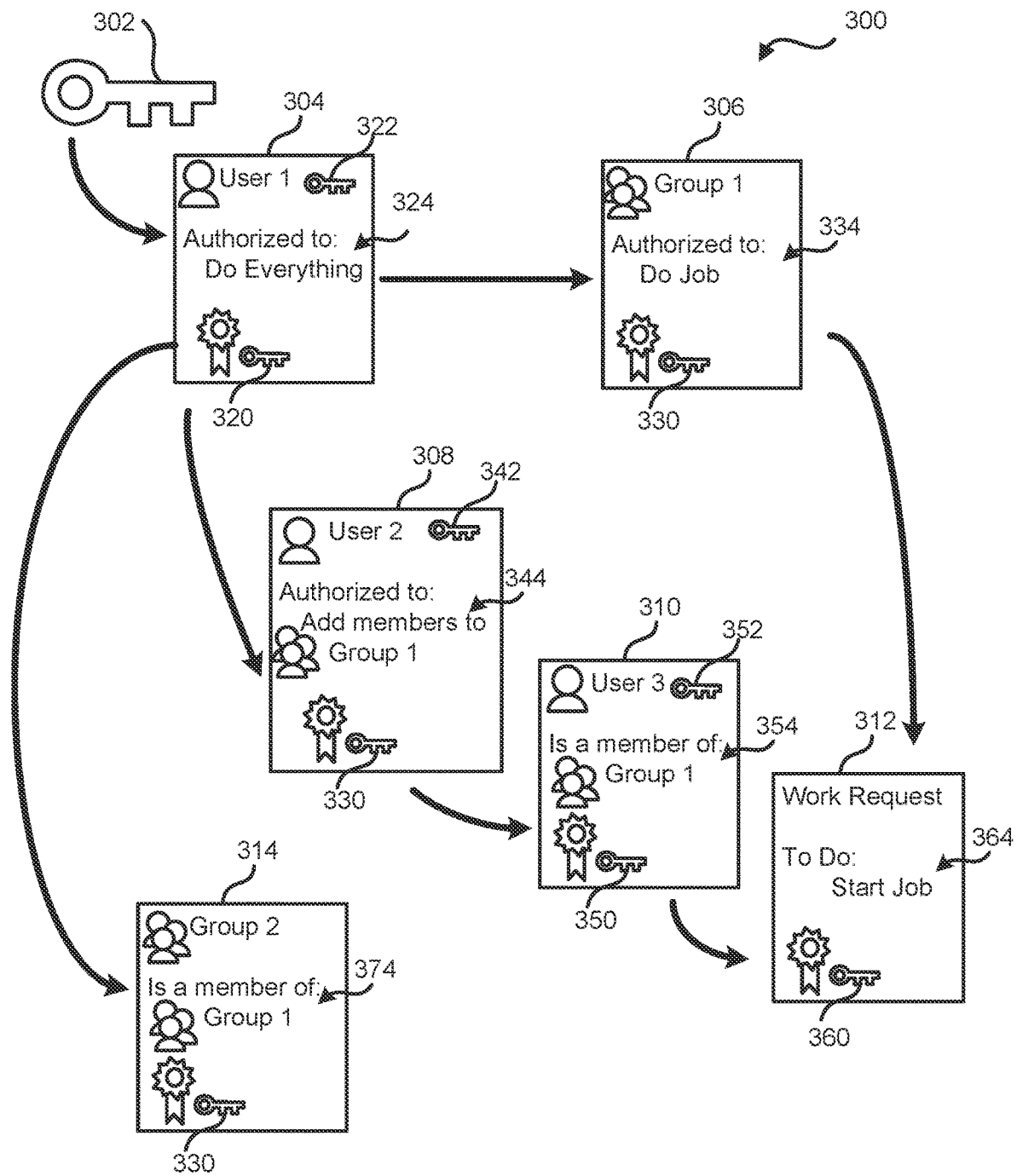
FIG. 3 is another diagram of a chain of role-based certificates according to at least one embodiment of the present disclosure.

FIG. 3 illustrates a chain of role-based certificates 300 according to at least one embodiment of the present disclosure. Chain of role-based certificates 300 includes owner/master key 302, a user certificate 304, a group certificate 306, a user certificate 308, a user certificate 310, a work request 314, and a group certificate 314. In an example, the users or their associated keys may be granted or authorized permissions within a multiple node environment, such as multiple node environment 100 of FIG. 1, by one or more of the certificates in chain of role-based certificates 300. In certain examples, a user may be able to perform work, such as an operation in endpoint node 108 of FIG. 1, if that user is permitted. For example, the user may be able to perform work granted by a certificate in chain of role-based certificates 300.

In an example, user certificate 304 may be created by private owner/master key 302 for an endpoint in a multiple node environment. User certificate 304 may include a cryptographic key signature 320 generated by private owner/master key 302. An endpoint node may verify cryptographic key signature 320 based on a public key of a public/private key pair associated with private owner/master key 302. In an example, user certificate 304 may also include a user public key 322 associated with a first user. In this example, user public key 322 may be part of a public/private key pair for the first user, and the user public key may be utilized by an endpoint node to verify certificates that are cryptographically signed with the associated user private key. User certificate 304 may grant the first user permissions 324 or authority to perform different tasks, such as 'do everything', in a multiple node environment. For example, the first user may have permissions to do work, grant permissions to other users or groups, assign people to any type of group/role, or the like.

Based on the permissions granted to the first user by user certificate 304, the first user may generate and cryptographically sign group certificate 306 and user certificate 308. In an example, group certificate 306 may include a cryptographic user signature 330 generated from a user private key of the first user. Group certificate 306 may implicitly define a group and grant any members of this group one or more permissions 334. For example, group certificate 306 may grant members of the group permissions 334 to do a job in an endpoint node of the multiple node environment. In certain examples, group certificate 306 may implicitly define the group may referencing that the group exists.

In certain examples, user certificate 308 may include cryptographic user signature 330 generated from a user private key of the first user, such as private key 146 of user node 104 in FIG. 1. An endpoint node may verify cryptographic key signature 330 based on a public key of a public/private key pair associated with the first user. In an example, user certificate 308 may also include a user public key 342 associated with a second user. In this example, user public key 342 may be part of a public/private key pair for the first user, and the user public key may be utilized by an endpoint node to verify certificates that are cryptographically signed with the associated user private key. User certificate 308 may grant the second user permissions 344 or authority to perform different tasks, such as 'add members to a particular group', in a multiple node environment. In an example, the particular group identified in user certificate 308 may be the group defined in group certificate 306.

Based on the permissions granted to the second user by user certificate 308, the second user may generate and cryptographically sign a user certificate 310. User certificate 310 may assign a third user membership in a group 354, such as the group defined by group certificate 306. In an example, user certificate 310 may define the third user or the associated private key as being allowed to perform the permissions of a given role or group 354.

In an example, user certificate 310 may also include a user public key 352 associated with the third user. In this example, user public key 352 may be part of a public/private key pair for the third user, and the third user public key may be utilized by an endpoint node to verify certificates that are cryptographically signed with the associated third user private key. User certificate 310 implies there is a particular group 354, and states that the third user is a member of that group. Based on user certificate 310, the third user is granted any permissions or privileges granted to members of the group identified in the user certificate.

Based on group certificate 306 and user certificate 310, the third user may perform an operation in endpoint node that the group has been granted permissions to perform. In an example, the third user may generate a work request 312 that may include cryptographic user signature 360 generated from a user private key of the third user, such as private key 156 of user node 106 in FIG. 1. In certain examples, work request 312 may include user certificate 304, group certificate 306, and user certificate 308 with respective cryptographic key signatures 320, 330, and 330. Based on work request 312 including user certificate 304, group certificate 306, and user certificate 308, the work request may be self-authenticating, such that the work request may data needed to attest that the third user has been given permission to have an operation 364 be performed in an endpoint node, such as endpoint node 108 of FIG. 1.

In an example, work request 312 may only include the request for operation 364 to be performed and key signature 350 generated by the private key for the third user. In this situation, the endpoint node may determine whether the needed certificates in chain of role-based certificates 300 are stored in the endpoint node to verify that the third user has been granted permissions to have requested operation 364 performed in the endpoint node. If the endpoint has all of the certificates in chain of role-based certificates 300, the endpoint may verify work request 312 and perform operation 364. However, if the endpoint does not have all of the certificates in chain of role-based certificates 300, the endpoint node may request that the third user provide the one or more missing signed certificates to complete the chain of role-based certificates before requested operation 364 will be performed. Thus, chain of role-based certificates 300 may enable the third user to perform operation 364 if the third user is attested as a member of a group and that group has been granted permissions to perform the operation.

Based on the permissions granted to the first user by user certificate 304, the first user may generate and cryptographically sign a group certificate 314. In an example, group certificate 314 may include a cryptographic user signature 330 generated from a user private key of the first user. Group certificate 314 may implicitly define a second group and assign the members of the second group to another group 374, such as the group defined by group certificate 306. In an example, group certificate 314 may define the members of the group defined by group certificate 413 as being allowed to perform the permissions of a given role or another group, such as the group defined by group certificate 306. In certain examples, group certificates may define groups in a hierarchal manner, such that permissions from one group may constitute permissions in another group. In an example, based on the permissions granted to the first user by user certificate 304, the first user may enable a system or device external to the multiple node environment to define users or entities part of a group.

As described herein, chain of role-based certificates, such as chain of role-based certificates 200 and 300, may be utilized in multiple node environment 100 of FIG. 1 to define groups or roles, to assign individuals or entities to groups, or the like. For example, a chain of role-based certificates may attest or declare membership for one or more individuals in a group. The chain of role-based certificates may also declare a group of entities who share a common role or roles, and assign give permissions to a group or role. The chain of role-based certificates further may declare members of one group to be inherently members of another group. The chain of role-based certificates may void or revoke membership in a group or role, and assign individuals or entities that may be allowed to attest membership in a group.

Figure 4:
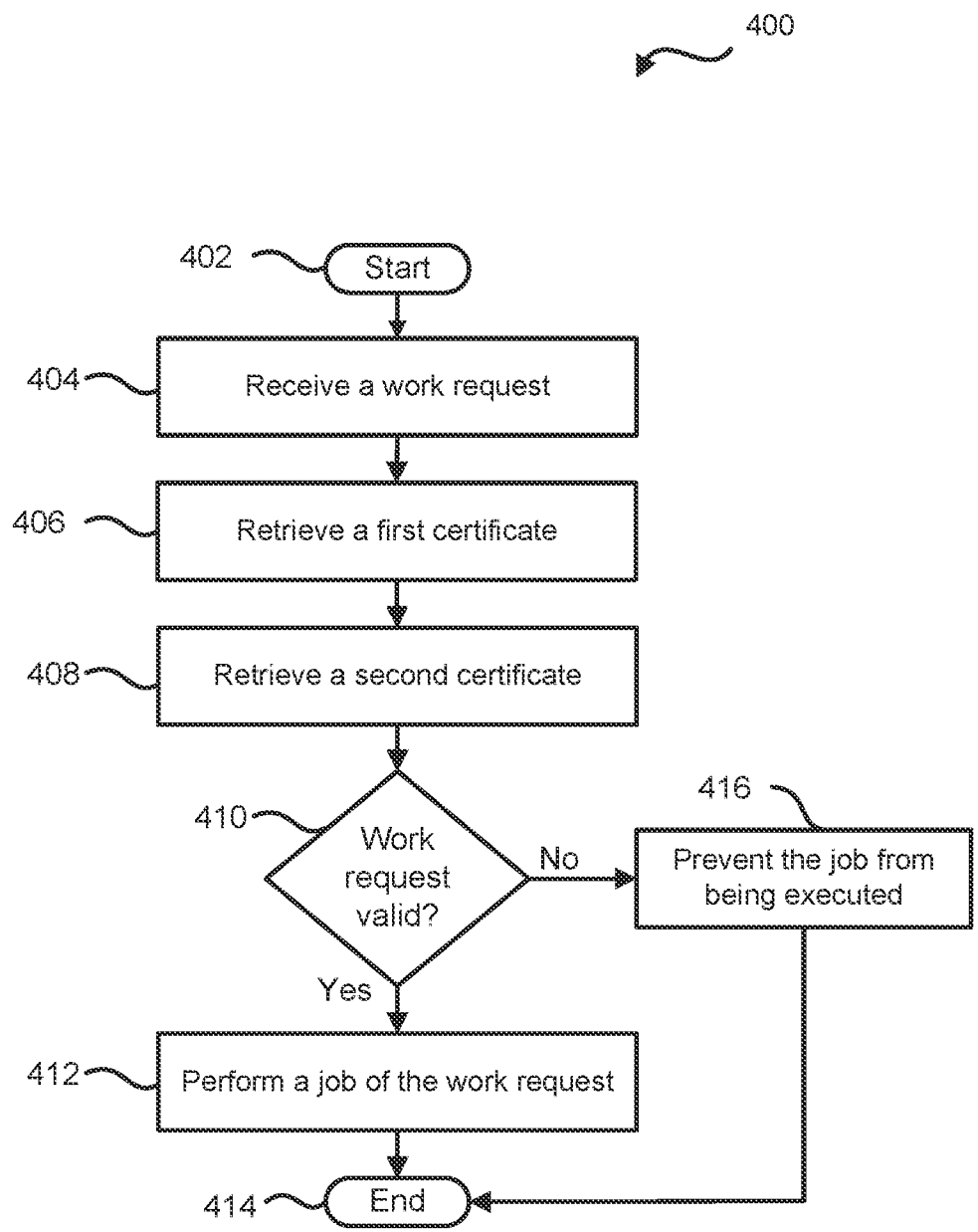
FIG. 4 is a flow diagram of a method for verifying a work request based on role-based certificates according to at least one embodiment of the present disclosure.

FIG. 4 illustrates a flow of a method 400 for verifying a work request based on role-based certificates according to at least one embodiment of the present disclosure, starting at block 402. It will be readily appreciated that not every method step set forth in this flow diagram is always necessary, and that certain steps of the methods may be combined, performed simultaneously, in a different order, or perhaps omitted, without varying from the scope of the disclosure.

At block 404, a work request for a job to be performed in an endpoint is received. In an example, an endpoint node may receive the work request from a user node. Each of the endpoint node and the user node may be part of a multiple node environment, and the user node may be associated with a user. In an example, the work request may be signed with a private key of the user node.

At block 406, a first certificate is retrieved. In an example, the first certificate may attest that the user associated with the user node is part of a group of users. In certain examples, the group of users may be any suitable individuals, entities, nodes, or the like associated with the endpoint node. For example, the group of users may be managers in a corporation, IT technicians, or the like. In an example, the first certificate may be retrieved from the work request, from a memory of the endpoint node, or the like.

At block 408, a second certificate is retrieved. In an example, the second certificate may attest that the group of users has permission to perform the job in the end point node. In certain examples, the second certificate may be retrieved from the work request, from a memory of the endpoint node, or the like.

At block 410, a determination is made whether the work request is valid. In an example, determination may be made based on the first and second certificates. The determination may be further based on an owner public key stored in a memory of the endpoint node. In certain examples, the first and second certificates may be parts of a chain of role-based certificates utilized to attest that a user associated with the work request has been granted permissions to perform the operation or job in the work request. If the work request is valid, the job within the endpoint node is performed at block 412 and the flow ends at block 414. If the work request is not valid, the job is prevented from being performed at block 416 and the flow ends at block 414.

Figure 5:
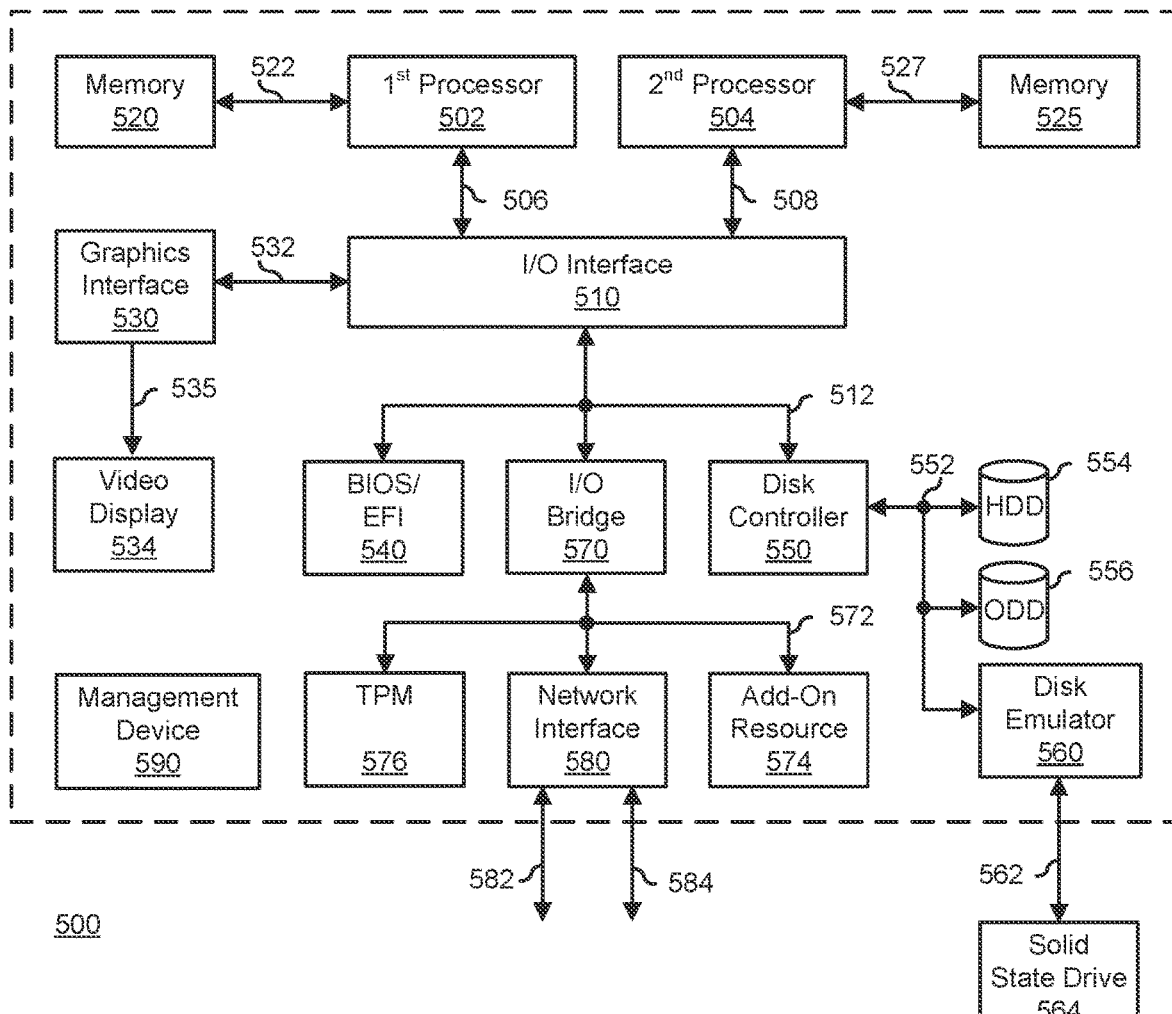
FIG. 5 is a block diagram of a general information handling system according to an embodiment of the present disclosure.

FIG. 5 shows a generalized embodiment of an information handling system 500 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described below and operates to perform one or more of the methods described below. Information handling system 500 includes a processors 502 and 504, an input/output (I/O) interface 510, memories 520 and 525, a graphics interface 530, a basic input and output system/universal extensible firmware interface (BIOS/UEFI) module 540, a disk controller 550, a hard disk drive (HDD) 554, an optical disk drive (ODD) 556, a disk emulator 560 connected to an external solid state drive (SSD) 562, an I/O bridge 570, one or more add-on resources 574, a trusted platform module (TPM) 576, a network interface 580, a management device 590, and a power supply 595. Processors 502 and 504, I/O interface 510, memory 520, graphics interface 530, BIOS/UEFI module 540, disk controller 550, HDD 554, ODD 556, disk emulator 560, SSD 562, I/O bridge 570, add-on resources 574, TPM 576, and network interface 580 operate together to provide a host environment of information handling system 500 that operates to provide the data processing functionality of the information handling system. The host environment operates to execute machine-executable code, including platform BIOS/UEFI code, device firmware, operating system code, applications, programs, and the like, to perform the data processing tasks associated with information handling system 500.

In the host environment, processor 502 is connected to I/O interface 510 via processor interface 506, and processor 504 is connected to the I/O interface via processor interface 508. Memory 520 is connected to processor 502 via a memory interface 522. Memory 525 is connected to processor 504 via a memory interface 527. Graphics interface 530 is connected to I/O interface 510 via a graphics interface 532 and provides a video display output 536 to a video display 534. In a particular embodiment, information handling system 500 includes separate memories that are dedicated to each of processors 502 and 504 via separate memory interfaces. An example of memories 520 and 530 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 540, disk controller 550, and I/O bridge 570 are connected to I/O interface 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 510 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 540 includes BIOS/UEFI code operable to detect resources within information handling system 500, to provide drivers for the resources, initialize the resources, and access the resources. BIOS/UEFI module 540 includes code that operates to detect resources within information handling system 500, to provide drivers for the resources, to initialize the resources, and to access the resources.

Disk controller 550 includes a disk interface 552 that connects the disk controller to HDD 554, to ODD 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits SSD 564 to be connected to information handling system 500 via an external interface 562. An example of external interface 562 includes a USB interface, an IEEE 4394 (Firewire) interface, a proprietary interface, or a combination thereof. Alternatively, solid-state drive 564 can be disposed within information handling system 500.

I/O bridge 570 includes a peripheral interface 572 that connects the I/O bridge to add-on resource 574, to TPM 576, and to network interface 580. Peripheral interface 572 can be the same type of interface as I/O channel 512 or can be a different type of interface. As such, I/O bridge 570 extends the capacity of I/O channel 512 when peripheral interface 572 and the I/O channel are of the same type, and the I/O bridge translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as I/O interface 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Management device 590 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 500. In particular, management device 590 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 500, such as system cooling fans and power supplies. Management device 590 can include a network connection to an external management system, and the management device can communicate with the management system to report status information for information handling system 500, to receive BIOS/UEFI or system firmware updates, or to perform other task for managing and controlling the operation of information handling system 500.

Management device 590 can operate off of a separate power plane from the components of the host environment so that the management device receives power to manage information handling system 500 when the information handling system is otherwise shut down. An example of management device 590 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 590 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An endpoint node of a multiple node environment, the endpoint node comprising:
   a storage configured to store an owner public key for an owner of the endpoint node; and
   a processor to communicate with the storage, the processor to:
      receive a work request for a job to be performed in the endpoint, wherein the work request is signed with a first private key for a first user node;
      retrieve a first certificate, wherein the first certificate attests that the first user node is part of a first group of users, wherein the first certificate is signed by a second private key of a second user, and the second certificate is signed by an owner private key for an owner of the endpoint node;
      retrieve a second certificate, wherein the second certificate attests that the first group of users has permissions to perform the job in the end point node;
      based on the owner public key and the first and second certificates, validate the work request; and
      in response to the work request being validated, perform the job within the endpoint node;
      retrieve a third certificate that grants permission to the second user to perform any action within the multiple node environment; and
      attest that the first certificate is valid based on the third certificate.

2. The endpoint node of claim 1, wherein the third certificate is signed by an owner private key for an owner of the endpoint node.

3. The endpoint node of claim 1, wherein the processor further to:
   receive first and second public keys, wherein the first public key is part of a first public/private key pair for the first user, wherein the second public key is part of a second public/private key pair for the second user; and
   store the first and second public keys in the memory of the endpoint node.

4. The endpoint node of claim 1, wherein the validating of the work request is further based on the owner public key.

5. The endpoint node of claim 1, wherein the first and second certificates are retrieved from data within the work request.

6. The endpoint node of claim 1, wherein the first and second certificates are retrieved from a memory of the endpoint node.

7. A method comprising:
   receiving, by a processor of an endpoint node of a multiple node environment, a work request for a job to be performed in the endpoint, wherein the work request is signed with a first private key for a first user node;
   retrieving, by the processor, a first certificate, wherein the first certificate attests that the first user node is part of a first group of users, wherein the first certificate is signed by a second private key of a second user, and the second certificate is signed by an owner private key for an owner of the endpoint node;
   retrieving a second certificate, wherein the second certificate attests that the first group of users has permissions to perform the job in the end point node;
   based on the first and second certificates, validating the work request; and
   in response to the work request being validated, performing, by the processor, the job within the endpoint node;

retrieving a third certificate that grants permission to the second user to perform any action within the multiple node environment; and attesting, by the processor, that the first certificate is valid based on the third certificate.

8. The method of claim 7, wherein the third certificate is signed by an owner private key for an owner of the endpoint node.

9. The method of claim 7, further comprising storing, in a memory of the endpoint node, an owner public key for an owner of the endpoint node.

10. The method of claim 9, wherein the validating of the work request is further based on the owner public key.

11. The method of claim 7, wherein the first and second certificates are retrieved from data within the work request.

12. The method of claim 7, wherein the first and second certificates are retrieved from a memory of the endpoint node.

13. A method comprising:

storing, in a memory of an endpoint node, an owner public key for an owner of the endpoint node;

receiving, by a processor of an endpoint node of a multiple node environment, a work request for a job to be performed in the endpoint, wherein the work request is signed with a first private key for a first user node;

retrieving, by the processor, a first certificate signed with a second private key for a second user node, wherein the first certificate attests that the first user node is part of a first group of users;

retrieving a second certificate signed by an owner private key for the owner of the endpoint node, wherein the second certificate attests that the first group of users has permissions to perform the job in the end point node;

retrieving a third certificate that grants permission to the second user to perform any action within the multiple node environment;

based on the owner public key and the first, second, and third certificates, validating the work request; and in response to the work request being validated, performing, by the processor, the job within the endpoint node.

14. The method of claim 13, further comprising:

receiving first and second public keys, wherein the first public key is part of a first public/private key pair for the first user, wherein the second public key is part of a second public/private key pair for the second user; and storing the first and second public keys in the memory of the endpoint node.

15. The method of claim 13, wherein the first and second certificates are retrieved from data within the work request.

16. The method of claim 13, wherein the first and second certificates are retrieved from a memory of the endpoint node.

* * * * *